Nov. 29, 1960 L. H. MORIN 2,961,715
METHOD OF PRODUCING RIMMED, LABLED, PLASTIC SPOOLS
Filed July 8, 1954 3 Sheets-Sheet 1
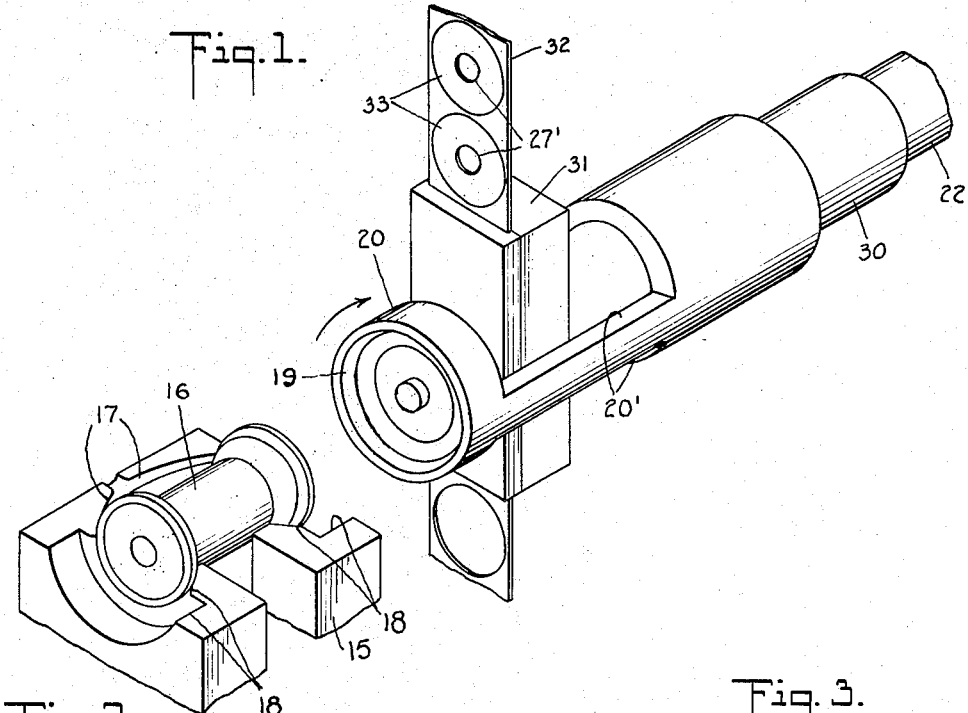
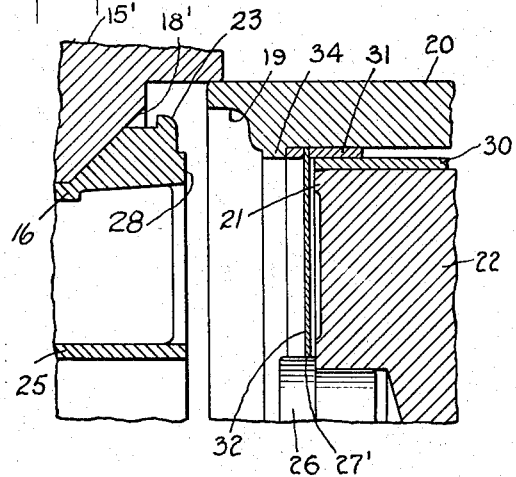
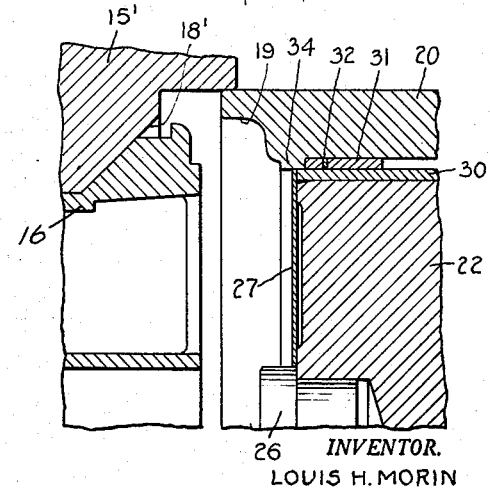
INVENTOR.
LOUIS H. MORIN
BY
ATTORNEY Nov. 29, 1960  L. H. MORIN  2,961,715
METHOD OF PRODUCING RIMMED, LABLED, PLASTIC SPOOLS
Filed July 8, 1954  3 Sheets-Sheet 2
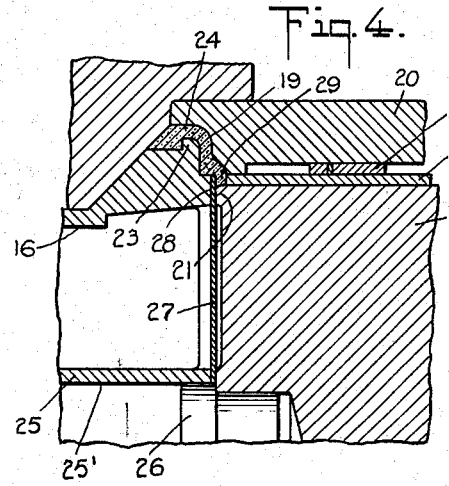
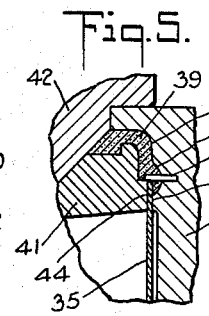
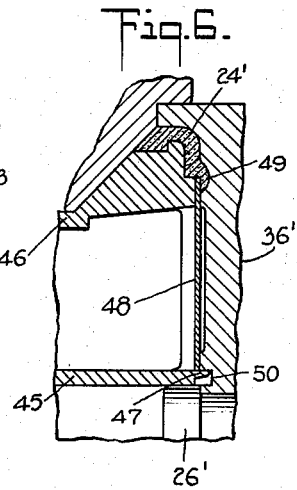
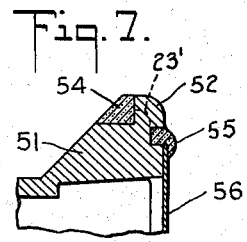
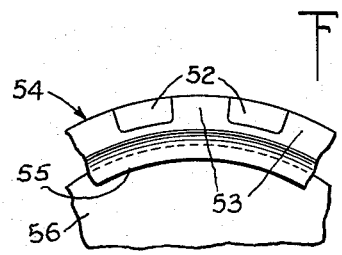
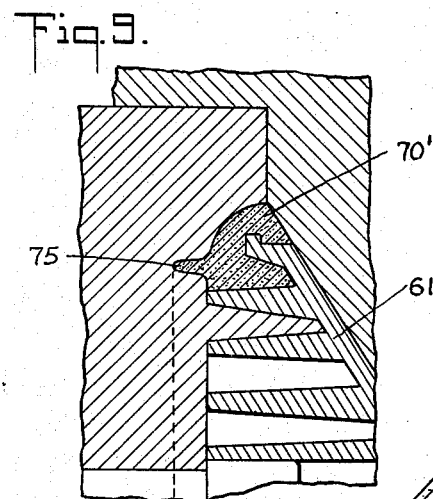
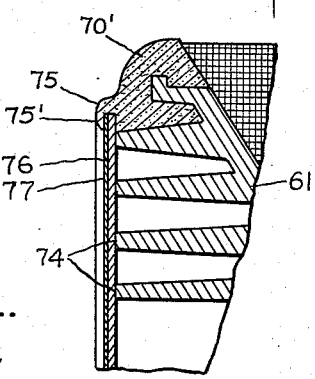
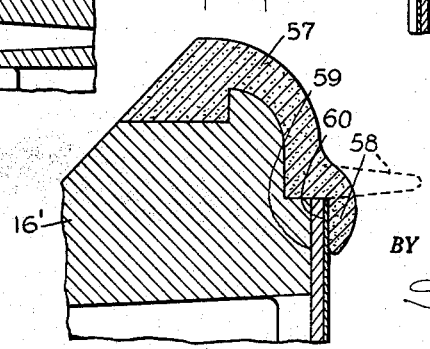
INVENTOR.
LOUIS H. MORIN
BY
*Howard E. Thompson*
ATTORNEY Nov. 29, 1960   L. H. MORIN   2,961,715
METHOD OF PRODUCING RIMMED, LABLED, PLASTIC SPOOLS
Filed July 8, 1954   3 Sheets-Sheet 3

INVENTOR.
LOUIS H. MORIN
BY
ATTORNEY

United States Patent Office 2,961,715
Patented Nov. 29, 1960

2,961,715
METHOD OF PRODUCING RIMMED, LABELED, PLASTIC SPOOLS

Louis H. Morin, Bronx, N.Y., assignor to Coats & Clark, Inc., New York, N.Y., a corporation of Delaware Filed July 8, 1954, Ser. No. 442,140

3 Claims. (Cl. 18—59)

This invention relates to methods of manufacturing spools employing moulded plastic bodies, preferably formed of inexpensive plastic material, including added plastic rims of a better grade of material and usually of a color contrasting to that of the color of material employed in the body of the spool.

More particularly, the invention deals with a method of forming a spool structure of the character described, wherein label, as well as label protective transparencies, can be automatically attached to the rims of spool ends, either in the operation of forming the rims on the spool bodies, or in shaping parts of the rims to retain the labels in position on the ends of the spool body.

Still more particularly, the invention deals with a novel method of producing spools of the kind under consideration.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic perspective view of part of an apparatus used in producing spools according to my invention.

Fig. 2 is an enlarged partial sectional view showing the step of supporting a label, preparatory to severing the same for attachment to a spool end.

Fig. 3 is a view, similar to Fig. 2, showing the label severed and partially advanced to the spool end.

Fig. 4 is a view, similar to Figs. 2 and 3, showing the label supported upon the spool end and illustrating the cast rim on the pool end and engaging said label.

Fig. 5 is a sectional detailed view, similar to Fig. 4, illustrating a modified method of alining a label.

Fig. 6 is a view, similar to Fig. 4, showing another method of alining a label.

Fig. 7 is a sectional detailed view of one corner portion of a spool showing a modified form of rim.

Fig. 8 is a detailed end view of the structure as seen in Fig. 7.

Fig. 9 is a sectional view showing the method of forming a rim on a pre-formed plastic spool body of different construction and illustrating a modified form of rim.

Fig. 10 is a detailed sectional view of a corner of a completed spool formed from the structure, as seen in Fig. 9.

Fig. 11 is a view, similar to Fig. 10, showing a modified form of spool and rim structure.

Figure 12:
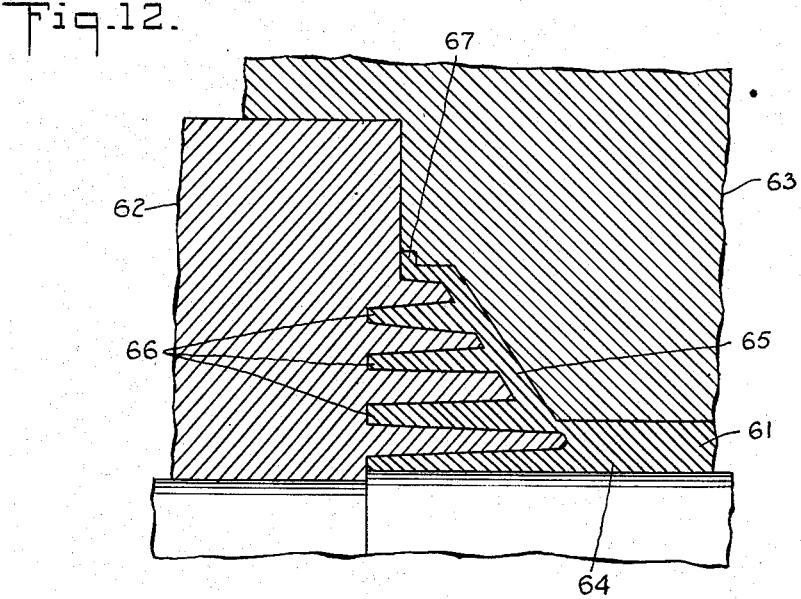
Fig. 12 is a sectional detailed view showing part of the mould for producing the spool body blank illustrated in Figs. 9 and 10.

In the production of moulded plastic spools, it has been the practice to mould the entire spool structure from a single plastic material and this material, in many instances, has been of a color to match or harmonize with the color of thread arranged upon the spool. Spool bodies made in this manner have been formed from plastic material which is rather expensive.

I have now found a method of utilizing for the main body portion of the spool an inexpensive, lower quality plastic material which can be of any desired color and to so shape this inexpensive body as to receive a moulded rim of a more expensive, higher quality material and one having a color usually contrasting to that of the body and suitable for use with the thread mounted upon the spool.

With this method of procedure, the cast-on rim can either include a moulded part directly engaging a label positioned upon a spool end, or the rim can be fashioned with an integral part which can be formed or spun-over to engage a label, or a label including a transparent covering therefor. By these methods of procedure, greater economy results in the production of the end product.

In illustrating one adaptation of my invention, I have shown diagrammatically in Figs. 1 to 4, inclusive, the method of producing one type of spool structure, in which the moulded rim includes an integral part engaging a label positioned upon a spool end. To simplify the disclosure, only one end of the spool is dealt with, it being understood, however, that the mechanisms are duplicated and both ends of the spools can be simultaneously processed.

In Fig. 1 of the drawing, I have shown diagrammatically a perspective view of an open die or mould 15, in which a pre-moulded spool body 16 is arranged, the mould 15 having gate or sprue passages 17 leading to the opposed ends of the spool body 16 for moulding of rims thereon. At this time, it might be well to state that suitable means will be provided for intermittently removing and replacing the spool bodies when the dies are in open position.

The die 15 has cavity portions 18 partially forming the rim end of the spool body 16 and, in Figs. 2, 3 and 4, at 15' is shown the other part of the die in section, this part of the die also having cavities, one of which is seen at 18', partially forming the other part of the rim cavity. The other portions of the rim cavity are formed by the die or mould recessed end 19 of a cylinder 20; whereas, another portion of the cavity is formed by a protruding annular portion 21 on a plunger 22. Note, in this connection, Fig. 4 of the drawing.

In forming the spool body 16, the rim end portions thereof are formed with projecting flanges 23 which serve to key the resulting moulded rim 24 upon the spool ends, as will clearly appear in Fig. 4 of the drawing. The spool body 16, in the construction shown, has a center tubular portion 25 and, at the end of the plunger 22 is a protruding headed pin 26, which is adapted to extend into the tube 25, the headed pin serving to aline a label 27 on the outer surface of the plunger, preparatory to moving the label 27 into engagement with the end surface 28 of the spool body 16. In this connection, it will also appear that the protruding portion 21 also serves to support the label 27 in firm engagement with the surface 28 during the operation of moulding the rim 24, the moulded rim including an annular flange portion 29 which overlies peripheral edges of the label 27, thus retaining the same in position thereon.

Slidably mounted upon the plunger 22 is a sleeve 30, which can be identified as the label stripping sleeve, and this sleeve, when at the end of its stroke, also forms part of the cavity forming the rim 24, as noted in Fig. 4 of the drawing.

At 31 I have shown a label strip guide, through which a label strip 32 is intermittently fed by suitable control means to present label sections 33 in position at the forward end of the plunger 22 and sleeve 30 for removal from the strip 32 in advancement to the end of the spool body. The guide 31 remains stationary; whereas, the cylinder 20 and associate parts move relatively thereto. For this purpose, the cylinder has an opening, noted at 20', in Fig. 1 of the drawing, providing movement of the parts mentioned.

In Fig. 1 of the drawing, the showing is entirely diagrammatic for clarity in the illustration and, as previously stated, only one of the label forming and applying units is shown, it being understood that a similar unit will be disposed at the other end portion of the spool body 16 and the die in which the same is seated. As the parts would simply be duplicated, the added showing is deemed to be unnecessary in the description of the method.

A more normal arrangement of the parts is illustrated in Fig. 2 of the drawing, in which figure the label guide 31, or part thereof, is shown in section abutting a shoulder portion 34 in the bore of the cylinder 20. In this position, the plunger 22 and sleeve 30 are disposed at the right side of the label strip 32. However, the plunger 22 has been advanced sufficiently to enter the headed pin 26 into the central aperture 27' of the resulting label 27. These apertures 27' are pre-formed in the strip 32, as noted in Fig. 1 of the drawing. This structure properly alines the strip 32 in front of the plunger 22, preparatory to advancing said plunger, as well as the trimming sleeve 30.

Considering now Fig. 3 of the drawing, here the plunger 22 and sleeve 30 have been advanced to trim or shear the label 27 from the strip 32 and the severed label is then supported between the headed pin 26 and the projection 34. From the position shown in Fig. 3, the cylinder 20, plunger 22 and sleeve 30, together with the pin 26, now advance to the position shown in Fig. 4, in which advancement the plunger 22 moves beyond the limit of travel of the sleeve 30 and the guide 31 remains at rest.

When the several parts are in the position shown in Fig. 4 of the drawing, heated plastic material is injected into the dies through the gate or sprue 17 to form the moulded plastic rim 24, after which, the parts 20, 22 and 30 are retracted to their normal position substantially as seen in Fig. 2 of the drawing, the dies are opened, the rimmed spool body 16 is removed from the dies and another spool body blank is placed in the open dies, the dies closed and the above operation repeated.

It will be apparent that the spool body 16 is premoulded and can be of any desired form and construction and shaped in any desired manner to establish anchorage of the rim thereon. Further, the label 27, shown in Figs. 1 to 4, inclusive, is a ring-type label, which leaves the bore 25' of the tube of the spool body open. Also, it will be apparent that solid labels, or labels omitting the apertures 27', can also be secured in position and the latter labels can be formed in any desired manner and simply mounted upon and alined upon the end of a cylinder and plunger structure.

To illustrate one of such adaptations and uses, I have shown, in Fig. 5, a label 35 of the solid-type, supported upon a die plunger 36 and alined thereon by a plurality of circumferentially spaced pins, one pin being illustrated at 37 in said figure. The pins 37 will protrude into the cavity portion 38 of the plunger 36 so that, in forming the resulting rim 39, apertures 40 will appear in the rim of the resulting rimmed spool. In this figure, 41 represents part of the pre-moulded spool body, in which the rim 39 is formed and 42 represents part of the die. The plunger 36 also includes a projection 43, similar to the projection 21, for supporting the label 35 upon the end surface 44 of the spool body 41 during the operation of moulding the rim 39. With the structure of Fig. 5, the use of the independent plunger 22 and sleeve 30 is dispensed with and suitable means will be provided to pre-cut the finished label 35 and mount the same upon the end of the plunger 36 within the alinement or centering pins 37.

As another alternative, I have shown, in Fig. 6 of the drawing, a slight modification of the structure shown in Fig. 5, wherein a plunger 36', generally similar to the plunger 36, is employed, being modified to the extent of omitting the pins 37 and, instead includes a center pin 26', similar to the pin 26 for entering the center tube 45 of a pre-moulded spool body 46 which is generally similar to the spool body 16, differing therefrom solely in having an outwardly projecting annular label centering flange 47. The flange 47 is at the end of the tube 45 and serves to centralize a label 48 directly upon the spool body 46. With this method of procedure, suitable means will be provided for first positioning the label 48 upon the ends of the spool body, after which, the plunger 36' will be advanced to support the label upon the end of the spool body during the operation of moulding the rim 24', which would be substantially identical to the rim 24, the only difference being that the label engaging portion 49 of the rim is of different cross-sectional form than the corresponding portion 29 of Fig. 4 of the drawing. With the structure shown in Fig. 6, the plunger 36' will also be recessed, as seen at 50, to receive the flange 47.

In Figs. 7 and 8, I have shown portions of one end of a modified form of rimmed spool, in which the spool body 51, generally similar in structure to the spool 16 or 41, 46, includes circumferentially spaced projections 52 on the anchor flange portion 23', otherwise similar to the flange 23, note Fig. 4. These projections 52 form corresponding recesses, into which portions 53 of the resulting rim 54 extend, as clearly noted in Fig. 8 of the drawing. The rim 54 includes an integral label engaging portion 55 for engaging a label 56 supported on the end of the spool body.

With the type of construction shown in Figs. 7 and 8 of the drawing, contrasting colors of plastics will, in most instances, appear at the rimmed ends of the spool, but the degree of exposure of the parts 52 is minimized and a saving of the material employed in the moulded rim 54 is effected.

At this time, it might also be well to point out that the material of the spool body, in addition to being less expensive, in some instances, also may constitute a plastic having less strength; thus, in a structure as shown in Figs. 7 and 8 of the drawing, desired reinforcement is acquired in extension of the stronger material of the rim to the peripheral portions thereof in the intervening parts 53.

In Fig. 11 of the drawing, I have shown at 16' a spool body, identical with the body 16 of Figs. 1 to 4, inclusive, in which is formed a modified rim 57, which differs from the rim 24 in forming a label holding flange or member 58 normally in the extended position indicated in dotted lines, after which, this member is fashioned or spun-over to engage and support a label 59 on the end of the spool body 16' and, at the same time, a facing disc 60 of transparent cellophane or the like can be attached. The spinning-over step is set forth in detail in copending applications Ser. Nos. 442,137, now abandoned, and 442,138, now Patent No. 2,922,192, both filed on July 8, 1954.

With the structure shown in Fig. 11, a plunger generally similar to the plunger 36' will be employed and 58, in its extended dotted line position, will serve to guide placement of the label 59 as well as the facing disc 60 in position upon the spool end. Here the label 59, as well as the disc 60 can either be solid or perforated.

In Figs. 9, 10, 12 and 13, I have shown at 61 a different type of spool body, that is to say, a body which is pre-moulded in dies 62 and 63, partially shown in section in Fig. 12 of the drawing, to form the deep grooved spool body 61 which comprises a center tubular portion 64 and flared end 65 of open-work construction having, for example, circumferentially spaced rib portions 66 and at the outer extremity an outwardly flanged portion 67 extending short of the ends of the ribs 66. Spools of this type and kind also include other ribbings which are not disclosed as they form no part of the present conception.

After pre-forming the spool body 61, the body is then arranged in other dies 68 and 69 in the process of forming the moulded rim 70 thereon. The die 68 includes a part 71 extending into a recess 72 between two of the ribs 66 in firm support of the end 65 in the dies 68 and 69. It will also appear that the die 68 includes a headed pin portion 73 which enters the tubular portion 61 of the spool body.

Figure 13:
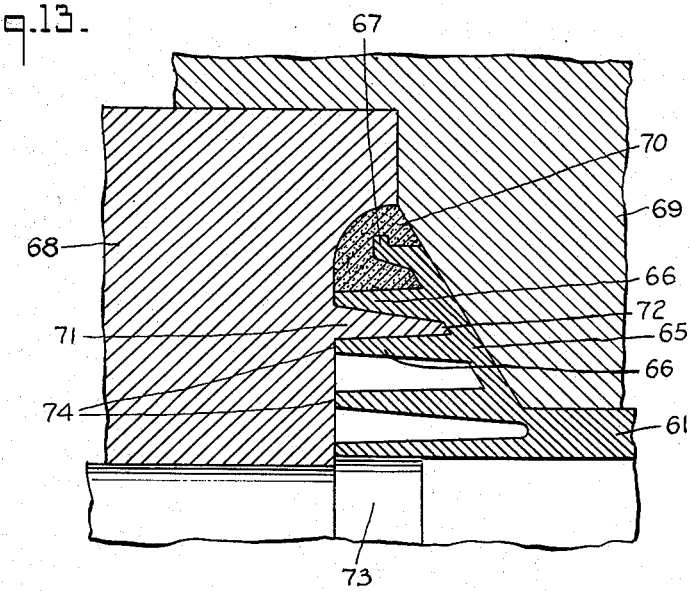
Fig. 13 is a view, similar to Fig. 9, showing a modified form of rim moulded upon the spool body illustrated in Fig. 12.

With the structure shown in Fig. 13, the moulded rim 70 simply finishes the peripheral end of the spool body and a label is adhesively or otherwise fixed to the rim, as well as the outer extremities 74 of the rib 66; in other words, with the structure shown in Fig. 13, no label engaging and supporting member, such as the members 29, 49, 55, and 58 are employed. This type of construction is also applicable to spools of the type and kind disclosed in Figs. 1 to 8, inclusive.

In Figs. 9 and 10 of the drawing, the structure of Fig. 13 is modified simply to the extent of adding to the moulded rim 70' an integral projecting label engaging member 75, which is normally moulded in the outwardly extended position, as shown in Fig. 9, after which a label 76 and, if desired, an outer transparency 77, is arranged upon the end of the spool body 61, or the surfaces 74, as well as part of the rim 70' and the member 75 is formed or spun-over, as seen at 75' in Fig. 10, to retain 76 and 77 in position upon the end of the spool. As the structure of Figs. 9 and 10 is otherwise generally similar to that shown in Fig. 13, no further detailed description with respect to the parts shown is deemed to be necessary.

From the foregoing, it will be apparent that my invention deals with the formation of a moulded rim of different characteristics upon a pre-moulded plastic spool body of any desired construction and, still further, in including in the moulding of the rim a label engaging and supporting portion, which may be directly positioned upon the label, or which can be shaped or spun-over to engage a label. These methods of procedure, in addition to reducing the cost of the resulting spool, adds to the appearance of the final spool with the thread wound therearound while, at the same time, giving required strength and stability to the rimmed end portions of the spool to withstand the handling to which the spools are subjected and, further, to facilitate the formation of the thread nicks in the rims for anchorage of the thread ends, as is now well known in this art.

It will appear from the several spool structures disclosed that the moulded rims include bevelled surfaces, which are in alinement with and form extensions of the bevelled inner surfaces of the rim end portions of the spool bodies. This construction provides the firm support of the thread wound upon the spool bodies, particularly in the longer windings of the thread at the outer extremity of the spool. As a matter of fact, the weaker portion of the inexpensive spool body is reinforced by the entire moulded rim.

To reduce the weight of the spools and to economize plastic, the spool bodies may be formed of so-called foamed plastic material as taught in copending application Ser. No. 456,239, filed September 15, 1954, now Patent No. 2,829,400, issued April 8, 1958.

Having fully described my invention, what I claim as new and desire to secure by Letters Patent is:

1. A method of making a plastic thread spool from a preformed plastic spool body having enlarged, bevelled, incomplete rim end portions and flat label-supporting end faces, each rim end portion having an annular keying projection extending radially outwardly thereof, which comprises positioning a rim end portion of the spool body in a rim-forming cavity of a pair of dies, moving an intermittently movable, successively printed strip at a label-forming station to position a printed portion of the strip relatively to an end face of said spool body, engaging said printed portion by means of a movable plunger to aline the same with said end face, cutting said printed portion from the strip by means of a movable outer sleeve concentric with said plunger, thereby forming a label, supporting the label in the bore of a movable outer cylinder concentric with said sleeve, moving the label by moving said plunger and sleeve to dispose the label on said spool body end face, holding the label against said end face by means of said plunger while coincidently moving the sleeve and cylinder to a position spaced from said end face, said plunger, sleeve, and cylinder cooperating with said dies to define said rim-forming cavity, injecting plastic material of higher grade than said spool body to the cavity to form therein a plastic rim which engages peripheral portions of said label and encircles the rim end portion of the spool body to hold the label in place and to form a complete rimmed end on the spool body, said rim having a bevelled surface alined with that of said rim end portion, said rim forming a peripheral part of said flat label-supporting end face and being of greater diameter than a label so as to expose to view said peripheral part, and said rim engaging the annular keying projection of the rim end portion to interlock the same on the spool body.

2. A method of making a plastic thread spool from a preformed plastic spool body having enlarged, bevelled, incomplete rim end portions and flat label-supporting end faces, each rim end portion having an annular keying projection extending radially outwardly thereof, which comprises positioning a rim end portion of the spool body in a rim-forming cavity of a pair of dies, moving an intermittently movable, successively printed strip at a label-forming station to position a printed portion of the strip relatively to an end face of said spool body, engaging said printed portion to aline the same with said end face, cutting said printed portion from the strip to form a label, moving the label to dispose the same on said spool end face, injecting plastic material of higher grade than said spool body to said cavity to form therein a plastic rim which engages peripheral portions of said label and encircles the rim end portion of the spool body to hold the label in place and to form a complete rimmed end on the spool body, said rim having a bevelled surface alined with that of said rim end portion, said rim forming a peripheral part of said flat label-supporting end face and being of greater diameter than a label so as to expose to view said peripheral part, and said rim engaging the annular keying projection of the rim end portion to interlock the same on the spool body.

3. A method of making a plastic thread spool from a preformed plastic spool body of low grade plastic material, said body having enlarged, bevelled, incomplete rim end portions and flat label-supporting end faces, each rim end portion having annular rim keying means thereon, which comprises positioning a rim end portion of the spool body in a rim forming cavity of a pair of dies, disposing an end ticket label on an end face of the spool, injecting plastic material of higher grade than said spool body to the cavity to form therein a plastic rim which encircles the rim end portion of the spool body to form a complete rimmed end thereon, said plastic rim being cast over and engaging peripheral portions of the label to hold the same in place, said rim having a bevelled surface alined with that of said rim end portion, said rim forming a peripheral part of said flat label-supporting end face and being of greater diameter than a label so as to expose to view said peripheral part, and said rim engaging the annular rim keying means of the rim end portion to interlock the same on the spool body.

References Cited in the file of this patent

UNITED STATES PATENTS

| | | | |
|---|---|---|---|
| 303,391 | Landfear | Aug. 12, | 1884 |
| 862,537 | Browne | Aug. 6, | 1907 |
| 1,589,177 | Kendall | June 15, | 1926 |
| 1,678,330 | Clyne | July 24, | 1928 |
| 1,978,985 | Cobb | Oct. 30, | 1934 |
| 2,287,277 | Ryder | June 23, | 1942 |
| 2,381,870 | Amrhein et al. | Aug. 14, | 1945 |
| 2,473,648 | Jakeway | June 21, | 1949 |
| 2,586,978 | Murray | Feb. 26, | 1952 |
| 2,651,476 | Morin | Sept. 8, | 1953 |
| 2,663,910 | Danielson et al. | Dec. 29, | 1953 |
| 2,683,572 | Morin | July 13, | 1954 |
| 2,689,096 | Morin | Sept. 14, | 1954 |
| 2,720,119 | Sherman | Oct. 11, | 1955 |
| 2,769,204 | Morin | Nov. 6, | 1956 |

FOREIGN PATENTS

| | | | |
|---|---|---|---|
| 2,079 | Great Britain | | 1854 |
| 493,009 | Great Britain | Sept. 30, | 1938 |